(12) United States Patent  (10) Patent No.: US 7,798,355 B2
Geisen et al.  (45) Date of Patent: Sep. 21, 2010

(54) COVER FOR A WATER SOFTENER SYSTEM

(75) Inventors: Christopher Raymond Geisen, Louisville, KY (US); Norman J. Boulard, Louisville, KY (US)

(73) Assignee: General Electric Company, Schenectady, NY (US)

( * ) Notice: Subject to any disclaimer, the term of this patent is extended or adjusted under 35 U.S.C. 154(b) by 1248 days.

(21) Appl. No.: 11/033,228

(22) Filed: Jan. 11, 2005

(65) Prior Publication Data

US 2006/0151365 A1 Jul. 13, 2006

(51) Int. Cl.
*B65D 43/20* (2006.01)
*B65D 51/18* (2006.01)

(52) U.S. Cl. .................. 220/254.9; 220/351; 220/254.2

(58) Field of Classification Search .............. 220/254.9, 220/345.4, 351, 345.5; 312/298; 224/483; 296/37.1, 37.8
See application file for complete search history.

(56) References Cited

U.S. PATENT DOCUMENTS

| | | | | | |
|---|---|---|---|---|---|
| 81,802 | A | * | 9/1868 | Lyman | ..................... 220/345.5 |
| 2,118,099 | A | * | 5/1938 | Mirk | ........................ 220/345.5 |
| 2,189,389 | A | * | 2/1940 | Baker | ...................... 220/345.5 |
| 2,223,023 | A | * | 11/1940 | Weilemann | .............. 220/345.5 |
| 2,276,635 | A | * | 3/1942 | Weber | ......................... 220/349 |
| 3,669,270 | A |   | 6/1972 | Flogel | |
| 4,026,801 | A |   | 5/1977 | Ward | |
| 4,217,011 | A |   | 8/1980 | Davis | |
| 4,740,297 | A |   | 4/1988 | Kanerva | |
| 4,757,913 | A | * | 7/1988 | Yerman | ..................... 220/345.5 |
| 4,819,829 | A | * | 4/1989 | Rosten et al. | ............. 220/345.3 |
| 5,531,346 | A | * | 7/1996 | Mosior | ...................... 220/254.9 |
| 6,129,836 | A |   | 10/2000 | Grayson | |
| 6,672,471 | B2 | * | 1/2004 | Cross | ....................... 220/345.4 |
| 6,863,808 | B2 |   | 3/2005 | Fullmer et al. | |

* cited by examiner

*Primary Examiner*—Anthony Stashick
*Assistant Examiner*—James N Smalley
(74) *Attorney, Agent, or Firm*—George L. Rideout, Esq.; Armstrong Teasdale LLP

(57) ABSTRACT

A water softener system cover assembly includes a cover removably coupled to the water softener system, the cover includes a control panel opening and a salt pour area opening. The assembly also includes a control panel cover portion slidably coupled to the cover for selective movement between a closed position covering the control panel opening and an open position exposing the control panel opening, and wherein the control panel cover portion is at least partially positioned between the salt pour area opening and the salt pour area cover portion when in the open position. The assembly further includes a salt pour area cover portion slidably coupled to the cover for selective movement between a closed position covering the salt pour area opening and an open position exposing the salt pour area opening, the salt pour area cover portion is configured such that said salt pour area cover portion is positioned at least partially above the control panel cover portion when in the open position.

10 Claims, 5 Drawing Sheets

1

COVER FOR A WATER SOFTENER SYSTEM

BACKGROUND OF THE INVENTION

This invention relates generally to water softeners and, more particularly, to a water softener having a slidable cover assembly.

Conventional water softeners are configured to pass hard water through an ion exchange resin or mineral bed to remove hardness ions from the water. The ion exchange resin or mineral, to a limited extent, also removes dissolved iron through an ion exchange process. The ion exchange resin or mineral bed is recharged to restore its hardness and iron removal capability by passing brine through the resin or mineral bed and by backwashing.

In some installations, the available space might not allow for the installation of a water softener of conventional size and shape. In such instances, at least some known installations utilize a low-profile water softener to soften the water supply for the home. Such a low-profile water softener typically includes a salt container, a top cover having a single opening for adding the salt, and a control system assembly that is positioned beneath the top cover. To replenish the salt in the water softener, an operator pours salt, typically from a rather large bag, through the single opening until the desired quantity of salt is achieved. When adding salt to the water softener, the operator could inadvertently contact or "bump" the control system, or salt could be spilled or salt dust could be generated during the pouring procedure that could inadvertently contaminate the control system. Consequently, the operator must utilize care to ensure that the control system is not damaged when adding salt to the water softener. Additionally, since the control system assembly is positioned beneath the top cover, the operator must remove the top cover to adjust or program the control system. Such removal exposes the control system assembly and associated wiring thereby increasing the possibility that the control system may be damaged.

BRIEF DESCRIPTION OF THE INVENTION

In one aspect, a water softener system cover assembly is provided. The cover assembly includes a cover removably coupled to the water softener system, the cover including a control panel opening, a salt pour area opening and a wall extending at least partially therebetween. The cover also includes a control panel cover portion and a salt pour area cover portion slidably coupled to the cover, the control panel cover portion is configured to selectively uncover the control panel opening while maintaining the salt pour area cover portion over the salt pour area opening, the salt pour area cover portion is configured to selectively uncover the salt pour area opening while maintaining the control panel cover portion over the control panel opening.

In another aspect, a water softener system cover assembly is provided. The cover assembly includes a cover removably coupled to the water softener system, the cover comprising a control panel opening and a salt pour area opening. The cover also includes a control panel cover portion slidably coupled to the cover for selectively covering the control panel opening. The control panel cover portion is configured to slide in a first direction, from a closed position in which the control panel cover portion covers the control panel opening, to an open position in which the control panel opening is exposed and the control panel cover portion is at least partially vertically positioned between the cover salt pour area opening and the salt pour area cover portion. The salt pour area cover portion is slidably coupled to the cover for selectively covering the salt pour area opening, the salt pour area cover portion is configured to slide in a second direction opposite the first direction from a closed position in which the salt pour area cover covers the salt pour area opening to an open position in which the salt pour area opening is exposed and the salt pour area cover is positioned at least partially above the control panel cover portion.

In another aspect, a water softener system is provided. The water softener system includes a cabinet, and a cover assembly removably coupled to the water softener cabinet. The water softener cover assembly includes a cover having a control panel opening and a salt pour area opening, a control panel cover portion slidably coupled to the cover for selectively covering the control panel opening, the control panel cover portion is configured to slide in a first direction such that the control panel cover portion is at least partially positioned between the cover salt pour area opening and the salt pour area cover portion and a salt pour area portion slidably coupled to the cover for selectively covering the control panel opening, the salt pour area cover portion is configured to slide in a second direction opposite the first direction such that the salt pour area cover is positioned at least partially above the control panel cover portion.

DETAILED DESCRIPTION OF THE INVENTION

Figure 1:
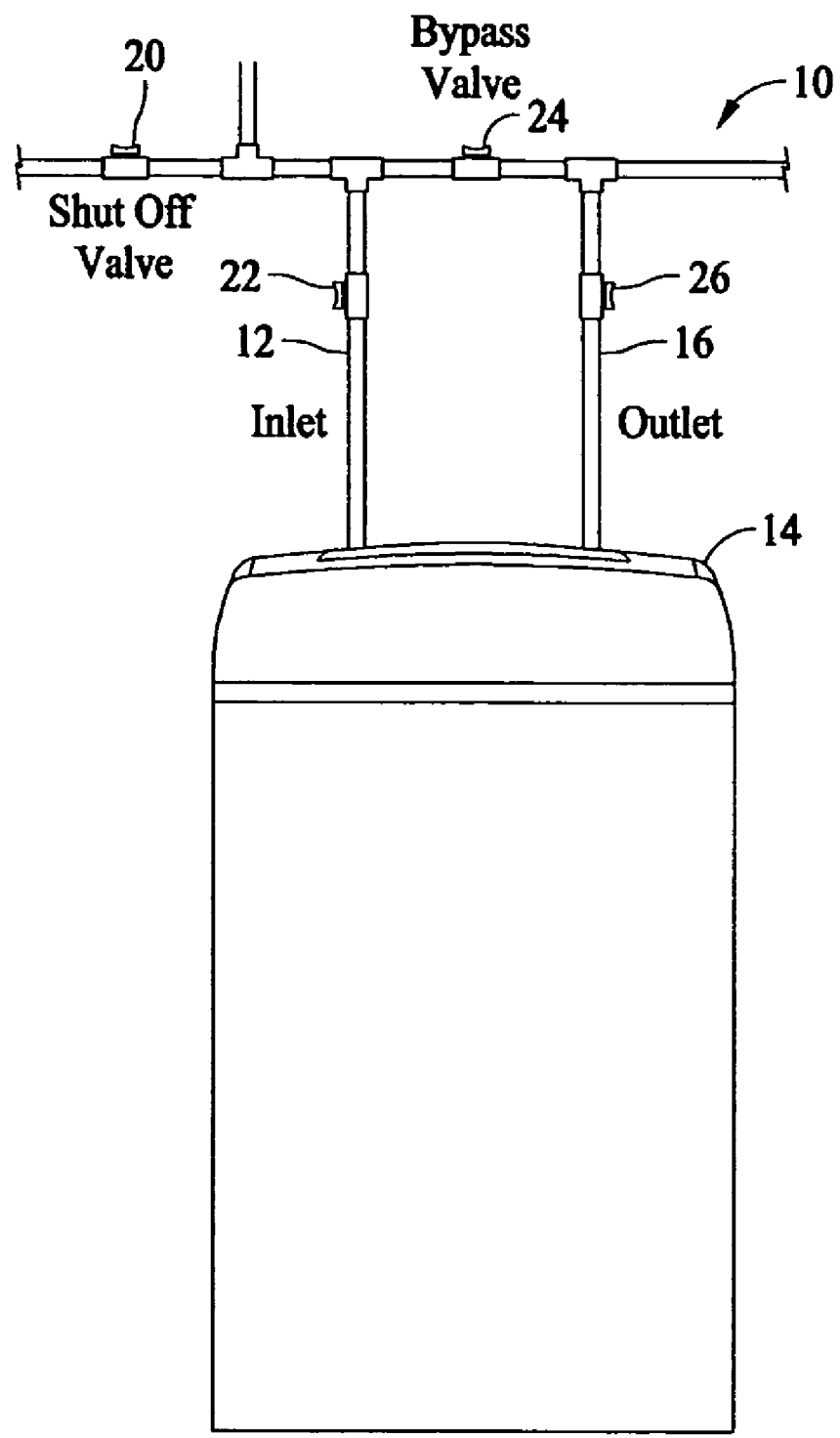
FIG. 1 is a schematic illustration of a water softener system.

FIG. 1 is a schematic illustration of a water softener system 10 including a hard water inlet 12, a water softener assembly 14, and a soft water outlet 16. System 10 is operative in a bypass mode and water softening mode.

In operation, hard water is channeled through a supply valve 20 to at least one of a water softener inlet valve 22 and a water softener bypass valve 24. For operation in the bypass mode, inlet valve 22 is in a closed position and bypass valve 24 is in an open position such that hard water is channeled through by pass valve 24 such that hard water is bypassed around water softener assembly 14. For operation in the water softening mode, inlet valve 22 is in an open position and bypass valve 24 is in a closed position such that hard water is channeled into water softener assembly 14 and out of water softener assembly 14 through an outlet valve 26.

Figure 2:
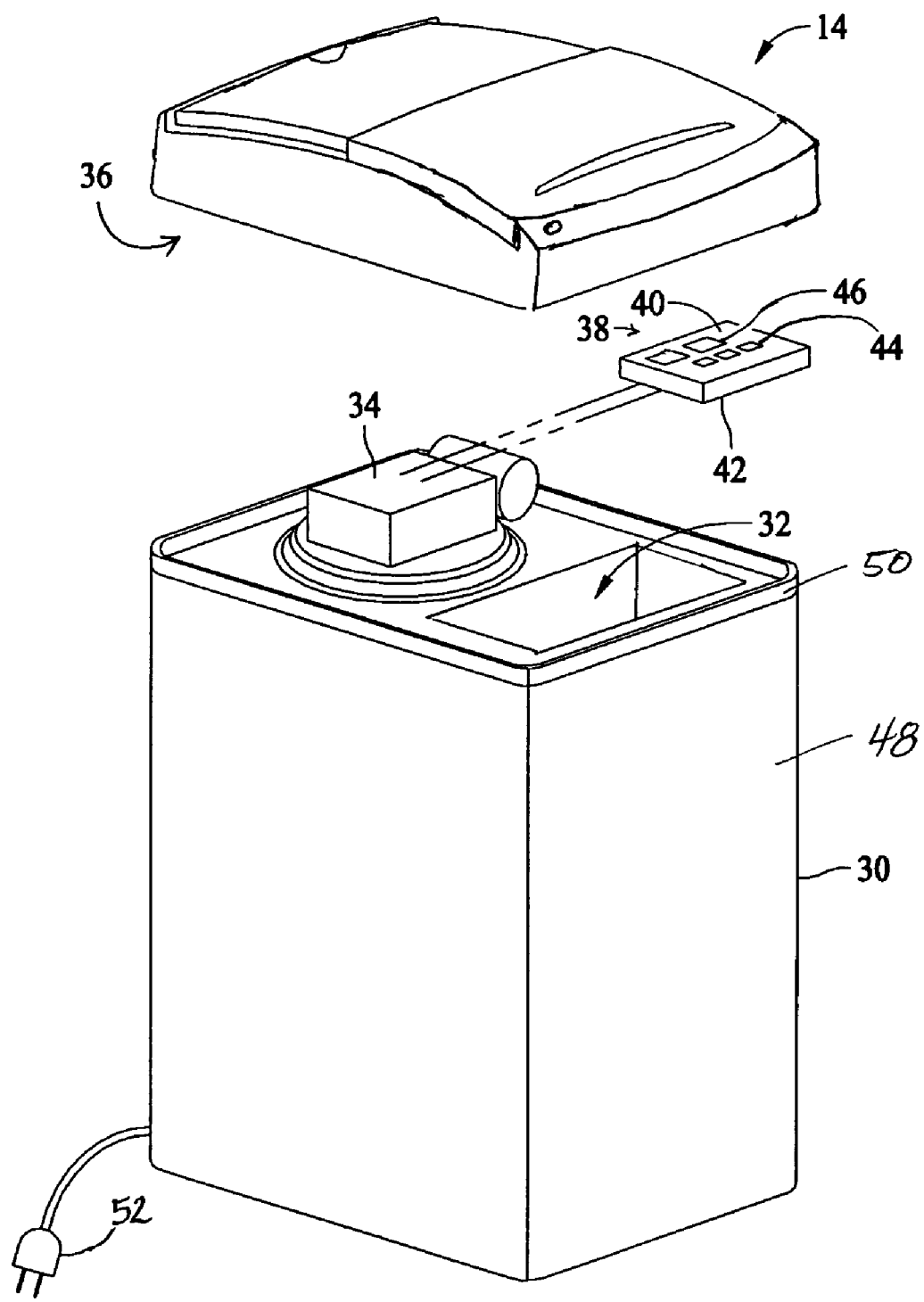
FIG. 2 is an exploded view of the water softener of the water softener system shown in FIG. 1.

FIG. 2 is an exploded view of water softener assembly 14. In the exemplary embodiment, water softener assembly 14 includes a cabinet 30, a media tank 32 that is positioned at least partially within cabinet 30, a valve assembly 34 coupled to media tank 32, a cabinet cover assembly 36 that is removably coupled to cabinet 30, and a control system assembly 38 that is operationally coupled to valve assembly 34. Control system assembly 38 includes a computer 40 that is configured to receive commands from an operator via a control panel 42 that includes a plurality of operator actuable input keys 44, and an associated control panel display 46. Control panel 42 which allows the operator to input the desired commands and operating parameters and to observe the display of various operating conditions and/or alarm conditions. The operator supplied commands and parameters are used by computer 40 to provide control signals and information to valve assembly 34.

Cabinet 30 includes a body 48 and a top portion 50. Cover assembly 36 is removably coupled to cabinet top portion 50. In one embodiment, top portion 50 is received within a portion of cover assembly 36. More specifically, top portion 50 is compressed radially inwardly such that friction is created between an inner surface of cover assembly 36 and an outer surface of top portion 50, and friction created retains cover assembly 36 on top portion 50. In another embodiment, top portion 50 includes an offset that mates with a reduced diameter portion of cover assembly 36 such that compressing the offset secures the cover assembly 36 to top portion 50. Additionally, cover assembly 36 may be configured to couple to top portion 50 such that removal of cover assembly 36 would not normally be done relying instead primarily on salt pour area opening 106 for access to media tank 32 for adding salt. In yet another embodiment, cover assembly 36 is configured to be uncoupled during maintenance or service of water softener assembly 14.

Computer 40 is programmed to perform functions described herein, and as used herein, the term computer is not limited to just those integrated circuits referred to in the art as computers, but broadly refers to computers, processors, microcontrollers, microcomputers, programmable logic controllers, application specific integrated circuits, and other programmable circuits, and these terms are used interchangeably herein.

In the exemplary embodiment, water softener assembly 14 also includes a power supply 52 to provide electrical current to various water softener components such as, but not limited to, valve assembly 34 and controller assembly 38.

In operation, hard water is channeled through supply valve 20, inlet valve 22, and into water softener assembly 14. More specifically, controller assembly 38 energizes valve assembly 34 such that hard water is channeled from inlet valve 22 and into media tank 32. The hard water then passes through a water softening bed (not shown) wherein the water softening process occurs thereby converting the hard water into soft water via an ion exchange process in conventional fashion.

Figure 3:
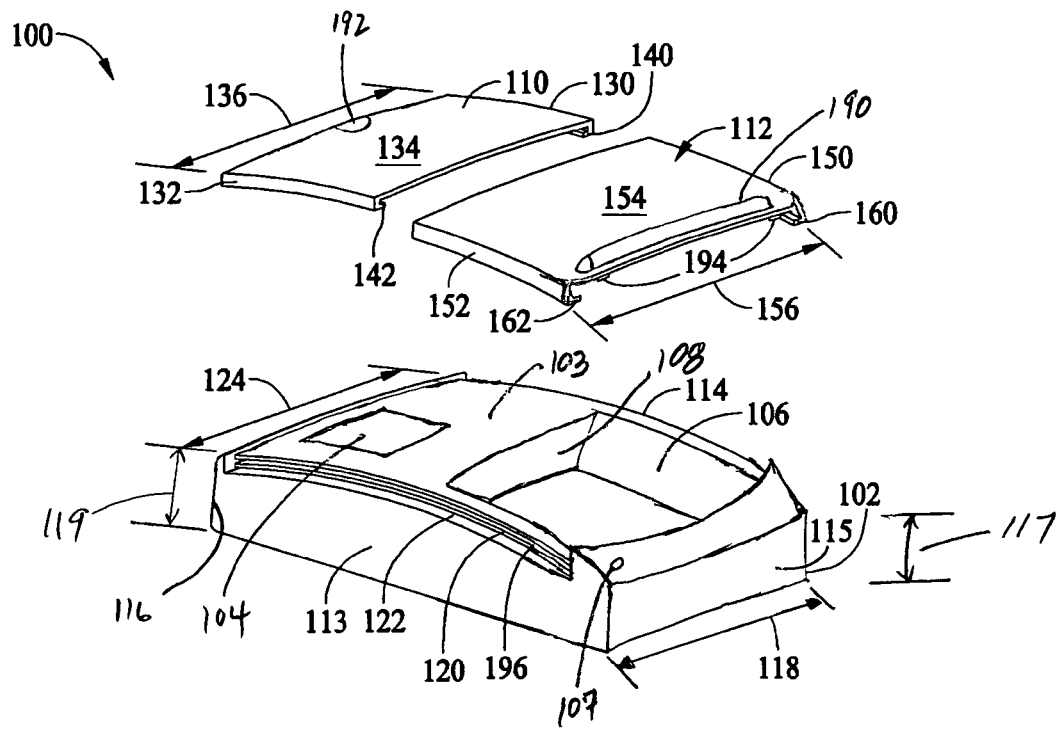
FIG. 3 is an exploded view of the water softener cover of the water softener shown in FIG. 2.
Figure 4:
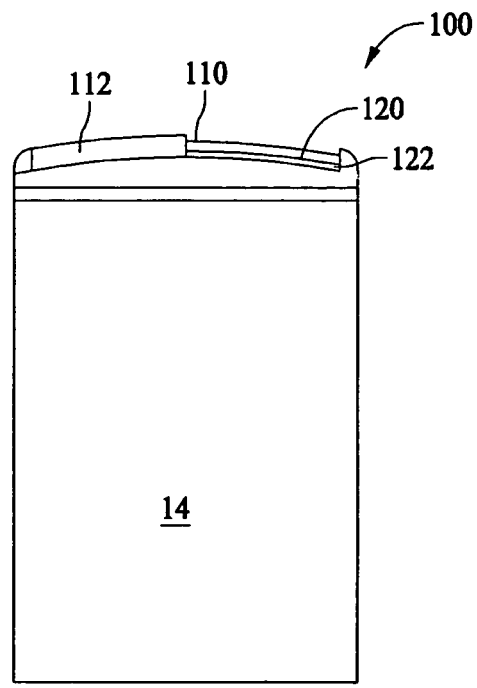
FIG. 4 is a side view of the water softener shown in FIG. 2.

FIG. 3 is an exploded view of water softener cover assembly 36 of water softener assembly 14 (shown in FIG. 2). FIG. 4 is a side view of water softener cover assembly 36 coupled to water softener assembly 14.

In the exemplary embodiment, cover assembly 36 includes a cover 102 that includes an upper surface 103 having formed therein a control panel opening 104, a salt pour area opening 106, a indicator opening 107, and a downwardly extending vertical wall 108 positioned between control panel opening 104 and salt pour area opening 106. When cover assembly 36 is fully attached to cabinet 30, control system assembly 38 projects upwardly through control panel opening 104 such that control panel 42 is aligned in opening 104 and the uppermost planar surface of control panel 42 being substantially flush with surface 103. Salt pour area opening 108 is aligned with media tank 32 to provide a conveniently accessible salt pour area through opening 108. Cover assembly 36 also includes a control panel cover portion 110 that is slidably coupled to cover 102 and a salt pour area cover portion 112 that is slidably coupled to cover 102.

In the exemplary embodiment, cover 102 includes a first side 113, a second side 114, and third side 115, and a fourth side 116 that are each coupled together such that cover 102 forms a unitary cover 102. Cover 102 also includes a width 118 that extends between first and second sides 113 and 114. Third side 115 has a height 117 and fourth side 116 has a height 119. In the exemplary embodiment, height 119 is greater than height 117. In an alternative embodiment, height 119 is substantially equal to height 117. First and second sides 113 and 114 each include a first groove 120 and a second groove 122 that extend approximately between third side 115 and fourth side 116. In the exemplary embodiment, first and second grooves 120 and 122 on first side 113 are positioned a distance 124 from first and second grooves 120 and 122 on second side 114. Distance 124 is less than cover width 118. In an alternative embodiment, distance 124 is substantially equal to cover width 118. In the exemplary embodiment, first groove 120 is positioned adjacent and approximately parallel to second groove 122.

Control panel cover portion 110 includes a first side 130, a second side 132, and an upper side 134 that are each coupled together such that control panel cover portion 110 forms a unitary control panel cover portion 110. Control panel cover portion 110 also includes a width 136 that extends between first and second sides 130 and 132 respectively. In the exemplary embodiment, control panel cover portion width 136 is less than cover width 118. In an alternative embodiment, control panel cover portion width 136 is substantially equal to cover width 118. First side 130 includes a tab 140 that extends from a lower surface of first side 130, and second side 132 includes a tab 142 that extends from a lower surface of second side 132. In the exemplary embodiment, first and second tabs 140 and 142 are inserted at least partially within first groove 120 such that control panel cover portion 110 is slidably engaged with cover 102.

Salt pour area cover portion 112 includes a first side 150, a second side 152, and an upper side 154 that are each coupled together such that salt pour area cover portion 112 forms a unitary salt pour area cover portion 112. Salt pour area cover portion 112 also includes a width 156 that extends between first and second sides 150 and 152 respectively. In the exemplary embodiment, salt pour area cover portion width 156 is greater than control panel cover width 136. First side 150 includes at least one tab 160 that extends from a lower surface of first side 150, and second side 152 includes at least one tab 162 that extends from a lower surface of second side 152. In the exemplary embodiment, first and second tabs 160 and 162 are inserted at least partially within second groove 122 such that salt pour area cover portion 112 is slidably engaged with cover 102.

Indicator opening 107 is sized to receive an indicator 161. In the exemplary embodiment, indicator 161 is an LED. In the exemplary embodiment, indicator opening 107 is positioned such that the cover does not need to opened to determine if indicator 161 is activated. In one embodiment, indicator 161 is used to indicate a low salt condition. In another embodiment, indicator 161 is used to indicate other conditions other than low salt. Multiple indicators could be similarly provided.

Figure 5:
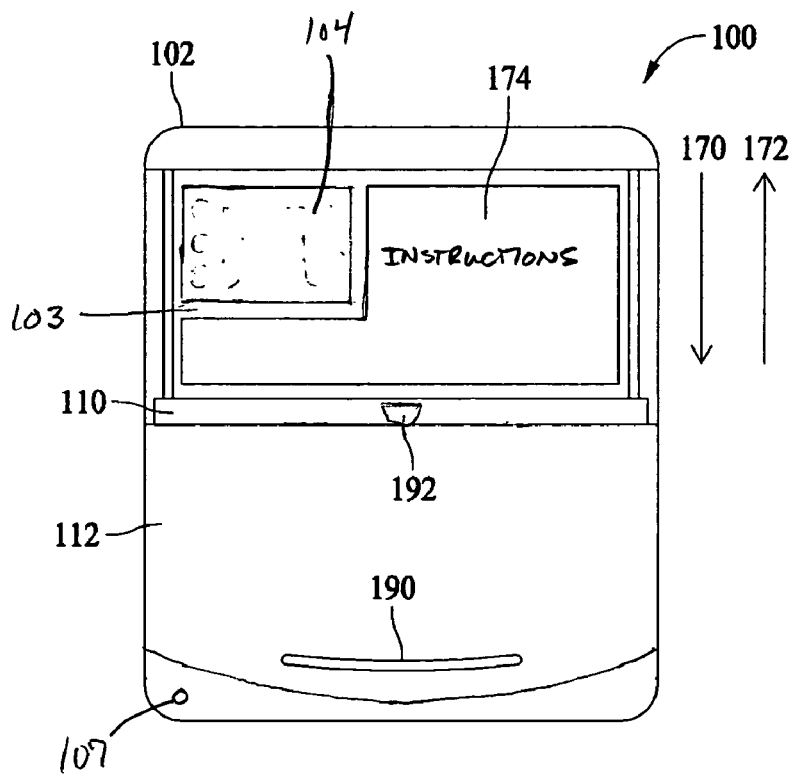
FIG. 5 is a top view of the water softener cover shown in FIG. 3 in a first operational configuration.
Figure 6:
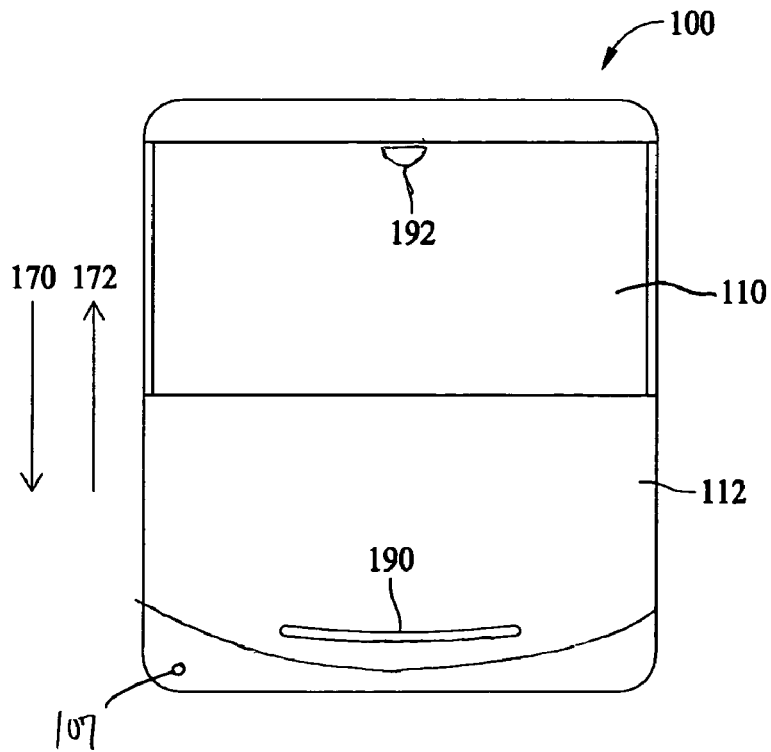
FIG. 6 is a top view of the water softener cover shown in FIG. 3 in a second operational configuration.
Figure 7:
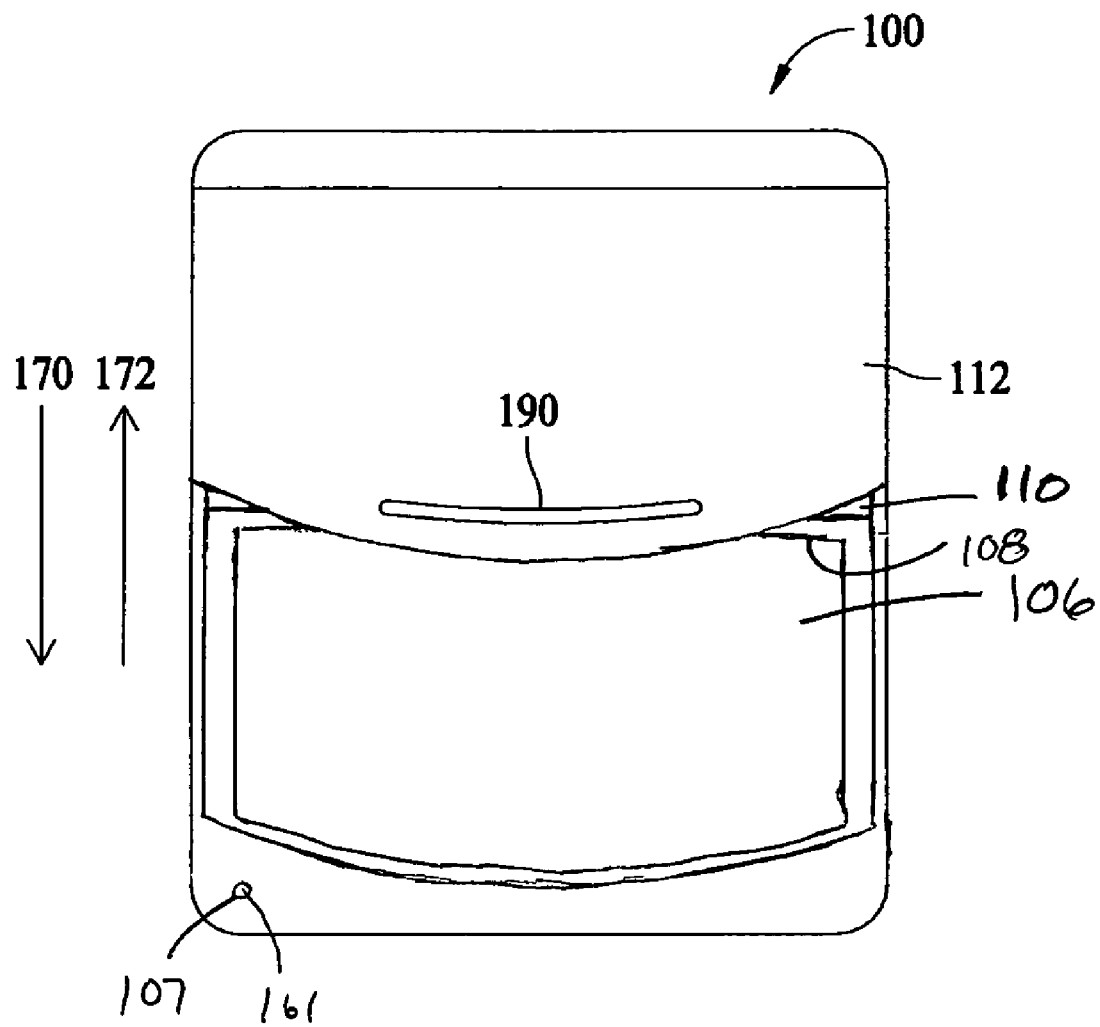
FIG. 7 is a top view of the water softener cover shown in FIG. 3 in a third operational configuration.

FIG. 5 is a top view of water softener cover assembly 36 in a first operational configuration in which control cover portion 110 is in the open position with control opening 104 and instruction area 174 fully exposed, and salt pour area cover portion 112 is in its closed position. FIG. 6 is a top view of water softener cover assembly 36 in a second operational configuration in which both cover portions 110 and 112 are in their closed positions. FIG. 7 is a top view of water softener cover assembly 36 in a third operational configuration in which the salt pour area opening 106 is fully exposed.

In operation, control panel cover portion 110 is operational in a first direction 170 and a second direction 172. Referring primarily to FIGS. 5 and 6, in the exemplary embodiment, control panel cover portion 110 is movable in first direction 170 from the closed position of FIG. 6 to the open position of FIG. 5. In this open position control panel 42 is accessible to the operator to facilitate allowing an operator to input a plurality of commands and parameters to computer 40. More specifically, when control panel cover portion 110 is transitioned in first direction 170, control panel cover portion is repositioned such that at least a portion of control panel cover portion 110 is positioned between cover 102 and salt pour area cover portion 112 such that control panel 42 is accessible to the operator without removing cover assembly 36 or moving salt pour area cover portion 112 from its closed position covering salt pour area opening 106. The area of surface 103 adjacent control panel opening 104 is also exposed when control panel cover portion 110 is in its open position and thus may be conveniently used to provide instructions or other information via media printed or otherwise fixed to surface 103. When control panel cover portion 110 is transitioned in second direction 172, to its closed position as illustrated in FIG. 6, control panel cover portion 110 substantially covers control panel opening 104 protecting control panel 42 from inadvertent operation or inadvertent contact which could otherwise occur when salt is added to water softener assembly 14.

Similarly, salt pour area cover portion 112 is operational in first direction 170 and second direction 172. In the exemplary embodiment, salt pour area cover portion is movable in second direction 172 to its open position as illustrated in FIG. 7. In this open position salt pour area opening 106 is exposed enabling the operator to add salt to water softener assembly 14. More specifically, when salt pour area cover portion 112 is transitioned in second direction 172, salt pour area cover portion 112 is repositioned such that at least a portion of salt pour area cover portion 112 is positioned above control panel cover portion 110 exposing opening 106. When salt pour area cover portion 112 is transitioned in first direction 170 to its closed position as illustrated in FIG. 6, salt pour area cover portion 112 substantially covers salt pour area opening 106 protecting against inadvertent addition of any foreign objects or chemicals into water softener assembly 14. In the exemplary embodiment, control panel cover portion 110 includes a handle 192 coupled to control panel cover portion 110, and salt pour area cover portion 112 includes a handle 190 that is coupled to salt pour area cover portion 112. In the exemplary embodiment, handle 190 extends from salt pour area cover portion 112 and handle 192 is recessed within control panel cover portion 110. In another embodiment, handles 190 and 192 are recessed within control panel and salt pour area cover portions 110 and 112 respectively such that control panel and salt pour area cover portions 110 and 112 do not contact first and second handles 190 and 192 when transitioned in either first or second directions 170 and 172. In another embodiment, handles 190 and 192 extend from control panel and salt pour area cover portions 110 and 112, respectively.

In the exemplary embodiment, salt pour area cover portion 112 also includes at least one stopper 194 that is coupled to a bottom side of salt pour area cover portion 112. Accordingly, and in the exemplary embodiment, salt pour area cover portion 112 is transitioned in second direction 172 until at least one stopper 194 of salt pour area cover portion 112 contacts control panel cover portion 110. Moreover, in the exemplary embodiment, control panel cover portion 110 is transitioned in first direction 170 until control panel cover portion 110 contacts an end 196 of first groove 120.

In an alternative embodiment, at least one stopper (not shown) is coupled to first groove 120, such that control panel cover portion 110 is transitioned in first direction 170 until control panel cover portion 110 contacts the stopper. In another alternative embodiment, control panel cover portion 110 is transitioned in first direction 170 until control panel cover portion 110 contacts at least one stopper 194 of salt pour area cover portion 112. In one embodiment, control panel cover portion 110 may be transitioned in second direction 172 by transitioning salt pour area cover portion 112 in second direction 172.

The cover assembly for a water softener system described herein includes a control panel cover portion and a salt pour area cover portion such that the control panel cover portion can be repositioned to allow the operator access to the water softener control system and the salt pour area cover portion can be repositioned to allow the operator access to the salt pour area. Specifically, during operation, one cover portion is positionable in its open position while the other cover portion remains in its closed position such that the water softener control panel can be accessed without removing the entire cover or accessing the salt pour area and the salt pour area can be accessed without an operator accessing or damaging the water softener control system. Thus, water softener system cover assembly provides significant potential time and cost savings to the home owner through reducing the likelihood that the water softener control system will be damaged when the home owner replenishes the salt. Additionally, the water softener system cover assembly facilitates protecting the control system assembly from external elements such as, for example, weather and/or ultraviolet light damage if the water softener system 10 is mounted outside. Indicator 161 illuminates to indicate low salt.

While the invention has been described in terms of various specific embodiments, those skilled in the art will recognize that the invention can be practiced with modification within the spirit and scope of the claims.

What is claimed is:

1. A water softener system cover assembly comprising:
a cover removably coupled to the water softener system, said cover defining a control panel opening and a salt pour area opening, each of a first side of said cover and an opposing second side of said cover having an outer surface defining a first groove and a second groove approximately parallel to said first groove, each of said first groove and said second groove extending approximately a full length of said first side of said cover and said second side of said cover, each of said first groove and said second groove comprising a first end and a second end opposite said first end;
a control panel cover portion slidably coupled to said cover for selective movement between a closed position covering said control panel opening and an open position exposing said control panel opening, said control panel cover portion is at least partially positioned between said salt pour area opening and said salt pour area cover portion when in said open position, said control panel cover portion comprising a first tab extending inward from a first side of said control panel cover portion and positioned within said first groove on said first side of said cover and a second tab extending inward from a second side of said control panel cover portion and positioned within said first groove on said second side of said cover enabling said control panel cover portion to be slidable between said first end of said first groove and said second end of said first groove; and a salt pour area cover portion slidably coupled to said cover for selective movement between a closed position covering said salt pour area opening and an open position exposing said salt pour area opening, said salt pour area cover portion configured such that said salt pour area cover portion is positioned at least partially above said control panel cover portion when in said open position, said salt pour area cover portion comprising a first tab extending inward from a first side of said salt pour area cover portion and positioned within said second groove on said first side of said cover and a second tab extending inward from a second side of said salt pour area cover portion and positioned within said second groove on said second side of said cover enabling said salt pour area cover to be slidable between said first end of said second groove and said second end of said second groove.

2. A water softener system cover assembly in accordance with claim 1 wherein said control panel cover portion has a first width and said salt pour area cover portion has a second width that is greater than said first width.

3. A water softener system cover assembly in accordance with claim 1 wherein said cover comprises a horizontal surface extending between said control panel opening and said salt pour area opening.

4. A water softener system comprising:
a cabinet; and
a cover assembly removably coupled to said cabinet, said cover assembly comprising:
a cover defining a control panel opening and a salt pour area opening, each of a first side of said cover and an opposing second side of said cover having an outer surface defining a first groove and a second groove approximately parallel to said first groove, each of said first groove and said second groove extending approximately a full length of said first side of said cover and said second side of said cover, each of said first groove and said second groove comprising a first end and a second end opposite said first end;
a control panel cover portion slidably coupled to said cover for selectively covering said control panel opening, said control panel cover portion configured to slide in a first direction such that said control panel cover portion is at least partially positioned between said salt access opening and said salt access cover portion, said control panel cover portion comprising a first tab extending inward from a first side of said control panel cover portion and positioned within said first groove on said first side of said cover and a second tab extending inward from a second side of said control panel cover portion and positioned within said first groove on said second side of said cover enabling said control panel cover portion to be slidable between said first end of said first groove and said second end of said first groove; and
a salt pour area cover portion slidably coupled to said cover for selectively covering said salt pour area opening, said salt pour area cover portion configured to slide in a second direction opposite said first direction such that said salt pour area cover is positioned at least partially above said control panel cover portion, said salt pour area cover portion comprising a first tab extending inward from a first side of said salt pour area cover portion and positioned within said second groove on said first side of said cover and a second tab extending inward from a second side of said salt pour area cover portion and positioned within said second groove on said second side of said cover enabling said salt pour area cover to be slidable between said first end of said second groove and said second end of said second groove.

5. A water softener system in accordance with claim 4 wherein said control panel cover portion has a first width and said salt pour area cover portion has a second width that is greater than said first width.

6. A water softener system in accordance with claim 4 further comprising a control system that is positioned beneath said control panel cover portion.

7. A water softener system in accordance with claim 4 further comprising a salt fill area that is positioned beneath the salt pour area cover portion.

8. A cover assembly for a water softener system including a cabinet, said cover assembly comprising:
a cover removably coupled to the cabinet, said cover comprising a control panel opening, a salt pour area opening, and a wall extending at least partially therebetween, each of a first side of said cover and an opposing second side of said cover having an outer surface defining a first groove and a second groove approximately parallel to said first groove, each of said first groove and said second groove extending approximately a full length of said first side of said cover and said second side of said cover, each of said first groove and said second groove comprising a first end and a second end opposite said first end; and
a control panel cover portion and a salt pour area cover portion slidably coupled to said cover, said control panel cover portion comprising a first tab extending inward from a first side of said control panel cover portion and positioned within said first groove on said first side of said cover and a second tab extending inward from a second side of said control panel cover portion and positioned within said first groove on said second side of said cover enabling said control panel cover portion to be slidable between said first end of said first groove and said second end of said first groove, said control panel cover portion configured to selectively uncover said control panel opening while maintaining said salt pour area cover portion over said salt pour area opening, said salt pour area cover portion comprising a first tab extending inward from a first side of said salt pour area cover portion and positioned within said second groove on said first side of said cover and a second tab extending inward from a second side of said salt pour area cover portion and positioned within said second groove on said second side of said cover enabling said salt pour area cover to be slidable between said first end of said second groove and said second end of said second groove, said salt pour area cover portion configured to selectively uncover said salt pour area opening while maintaining said control panel cover portion over said control panel opening.

9. A cover assembly in accordance with claim 8 wherein said control panel cover portion is configured to slide in a first direction such that said control panel cover portion is at least partially positioned between said salt pour area opening and said salt pour area cover portion.

10. A cover assembly in accordance with claim 9 wherein said salt pour area cover portion is configured to slide in a second direction opposite said first direction such that said salt access cover portion is positioned at least partially above said control panel cover portion.

* * * * *